March 2, 1971  D. R. CRAIG  3,567,313
OPTICAL FOLIAGE PENETRATOR
Filed April 4, 1969  2 Sheets-Sheet 1

INVENTOR
DWIN R. CRAIG,

BY Kimmel, Crowell & Weaver
ATTORNEYS

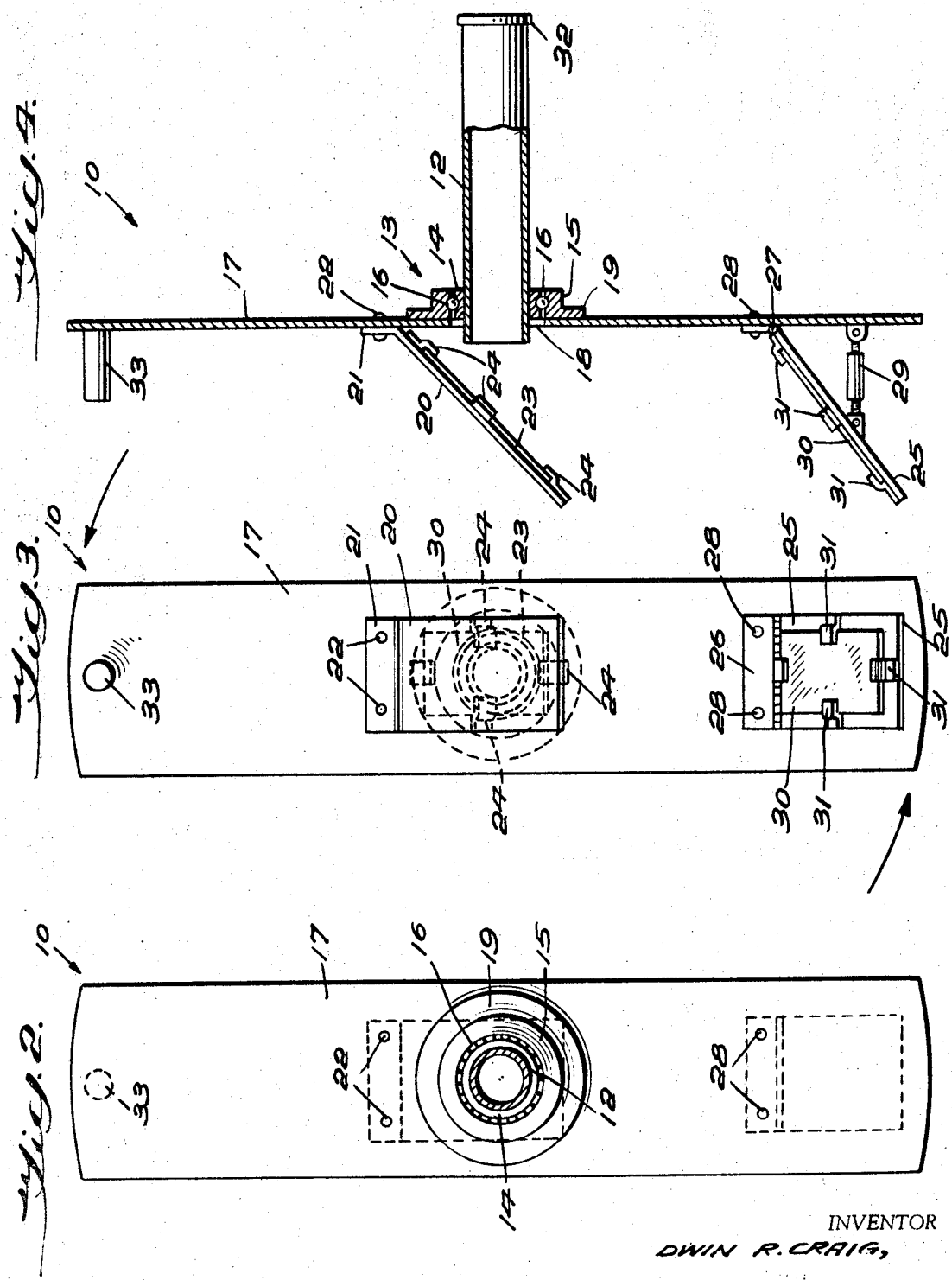

United States Patent Office 3,567,313
Patented Mar. 2, 1971

3,567,313
OPTICAL FOLIAGE PENETRATOR
Dwin R. Craig, Gaithersburg, Md., assignor to
Ingenuics, Inc., Gaithersburg, Md.
Filed Apr. 4, 1969, Ser. No. 813,415
Int. Cl. G02b 5/08
U.S. Cl. 350—299                                    6 Claims

ABSTRACT OF THE DISCLOSURE

A device for permitting optical penetration of foliage by constantly changing the line of sight through the foliage so as to utilize the limited open areas existing in foliage to provide an optical sight path. Mechanically, the device includes a central viewing tube and a pair of mirrors arranged so that the outer mirror can rotate in a relatively wide circle.

BACKGROUND OF THE INVENTION

Field of the invention

The present invention relates to devices for optically penetrating foliage of the type which blocks the view from any one position but has sufficient open spaces therein to establish limited visual paths therethrough. Normally, such foliage presents such a barrier to vision that only occasional glimpses can be obtained of objects beyond the foliage and then generally only if the objects has a contrasting color and is in motion. With the apparatus of the instant invention, objects on the far side of foliage can be viewed quite distinctly from the same position from which the natural vision is blocked.

Description of the prior art

Prior art devices for optically penetrating foliage comprise complicated constructions involving infrared light, expensive optical systems, and the like. At best, such devices only slightly improved the vision through foliage and at worst, no improvement at all was noted.

SUMMARY OF THE INVENTION

The present invention includes a pair of mirrors mounted at 45° approximately to the line of sight with the mirrors generally parallel to each other and spaced so that one mirror is positioned centrally and the second mirror is positioned at a point widely spaced outwardly from center with the mirrors being arranged to rotate about the central line of sight while viewing an object beyond a foliage screen.

BRIEF DESCRIPTION OF THE DRAWINGS

FIG. 2 is a rear view of the device;
FIG. 3 is a front elevation of the device;
and
FIG. 4 is a vertical cross-section taken through the device shown partly broken away for convenience of illustration.

DESCRIPTION OF THE PREFERRED EMBODIMENT

Figure 1:
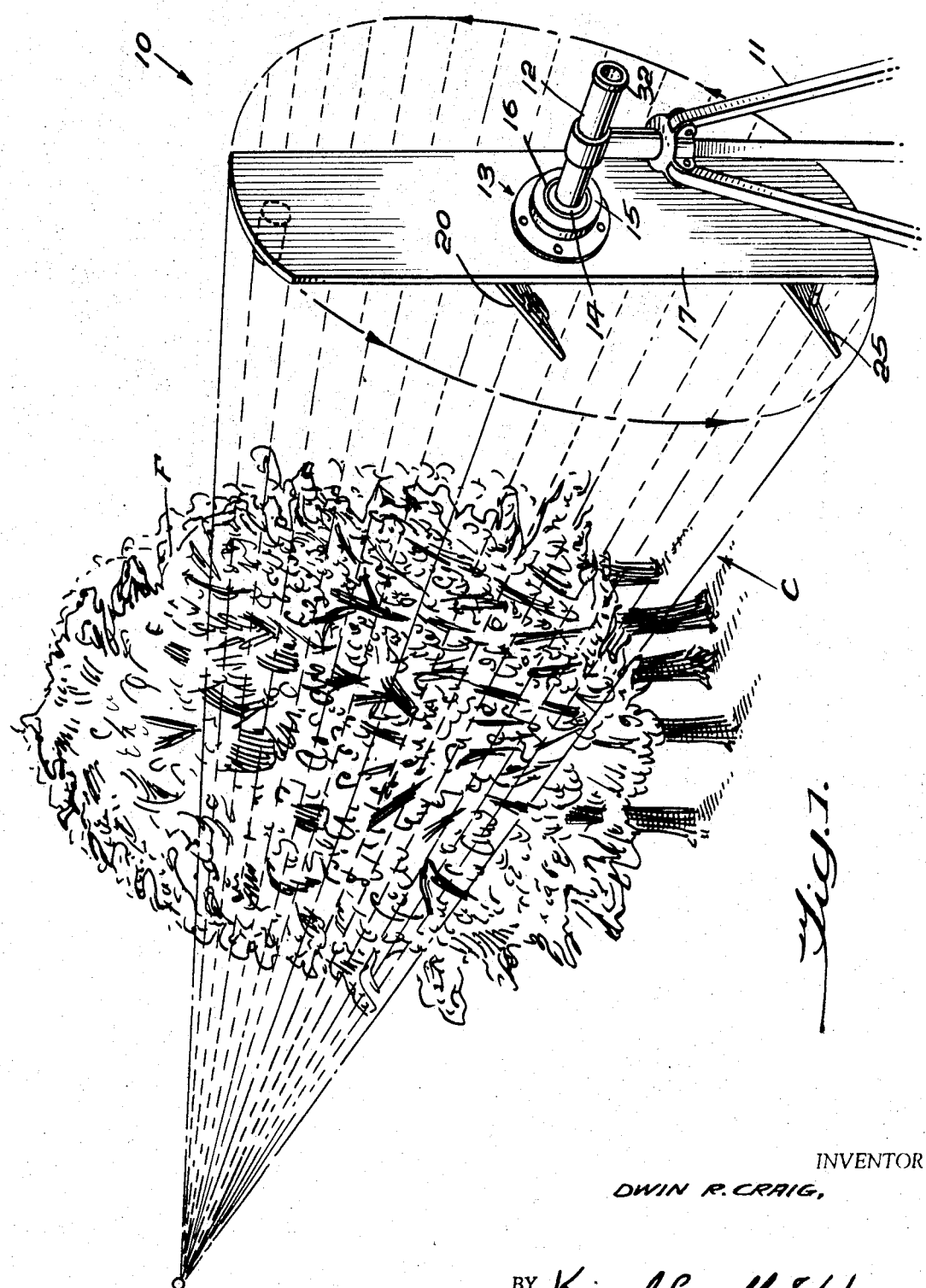
FIG. 1 is a perspective view of the invention illustrating the lines of sight penetrating foliage.

Referring now to the drawings in detail wherein like reference characters indicate like parts throughout the several figures, the reference numeral 10 indicates generally an optical foliage penetrator constructed in accordance with the invention.

The optical foliage penetrator 10 includes a support such as a tripod 11 having a sight tube 12 mounted on the upper end thereof in a generally horizontal plane.

A bearing generally indicated at 13 has its inner race 14 mounted on the sight tube 12 adjacent the outer end thereof. An outer race 15 of the bearing 13 is associated with the inner race 14 through a plurality of ball bearings 16.

A relatively flat elongate plate 17 has a central bore 18 through which one end of the sight tube 12 extends and is mounted on a flange 19 of the outer race 15 so that the plate 17 may be rotated about the sight tube 12 freely. A support panel 20 is provided with an angular flange 21 secured to the plate 17 by rivets 22. The panel 20 extends at approximately 45° from the plate 17 as can be clearly seen in FIG. 4. A mirror 23 is secured to the lower face of the panel 20 by a plurality of clips 24.

A second panel 25 is hinged to a leaf 26 by a pin 27 and the leaf 26 is secured to the plate 17 by a pair of rivets 28. The lower edge of the panel 25 is supported by a turnbuckle 29 connected at its other end to the plate 17. The turnbuckle 29 permits the angle of the panel 25 to be adjusted with respect to the plate 17 and the panel 20.

A mirror 30 is secured to the panel 25 by a plurality of clips 31.

In the use and operation of the invention, the observer stands behind the tripod 11 and places one eye to the eye piece 32 of the sight tube 12 and the line of sight is reflected at right angles by the mirror 23 toward the mirror 30 where it is again reflected at approximately right angles toward the foliage generally indicated at F in FIG. 1. The plate 17 is then rotated on the bearing 13 with the counterweight 33 balancing the off-center weight on the plate 17. By adjusting the angle of the panel 25 and thus the mirror 30, a focus point for the line of sight can be set to intersect the object it is desired to see. The rotation of the plate 17 and consequently, of the mirrors 23, 30, produces a conical line of sight such as is illustrated at C in FIG. 1 and with each revolution of the plate 17, the line of sight will coincide with a portion of the open spaces existing in the foliage, permitting a relatively clear view of the object beyond the foliage which is blocked by the foliage from normal viewing.

The plate 17 is rotated on the sight tube 12 at a speed of from about 20 r.p.m. to about 200 r.p.m.

Having thus described the preferred embodiment of the invention, it should be understood that numerous structural modifications and adaptations may be resorted to without departing from the spirit of the invention.

I claim:
1. An optical foliage penetrator comprising:
   an elongated substantially hollow sight tube having a pair of opposed open ends;
   an elongated substantially flat plate having, respectively, an opposed pair of ends and sides;
   means centrally positioned intermediate the ends of said plate for journalling said plate for rotation adjacent one end of said sight tube;
   means on one side of said plate intermediate the ends thereof and immediately adjacent said one end of said sight tube for reflecting a beam of light into said sight tube;
   second means on said one side of said plate and adjacent one of its ends for reflecting a beam of light from an object at a remote point substantially aligned with said sight tube and onto said first reflecting means, said second reflecting means being spaced radially at greater distance from the axis of rotation of said plate than the radial distance of said first reflecting means relative thereto; and
   means on the other end of said plate for effecting rotation thereof on said sight tube, said last-named means including a counter-weight fixedly connected on said other end of said plate whereby continuous rotation of said plate may be effected at a speed of from 20 r.p.m. to 200 r.p.m.

2. A device as set forth in claim 1 wherein said counterweight projects laterally from said plate to form a handle for rotating said plate.

3. A device as claimed in claim 1 wherein means are provided on said plate for adjusting the angle of said second named reflecting means with respect to said plate for reflecting the beam of light from said object into the sight tube.

4. A device as claimed in claim 3 wherein said reflecting means comprise mirrors.

5. A device as claimed in claim 4 wherein said journalling means comprises an anti-friction bearing connecting said plate on said sight tube.

6. A device as claimed in claim 5 wherein a tripod is provided supporting said sight tube and said plate with said sight tube in a generally horizontal plane.

References Cited

UNITED STATES PATENTS

| | | | |
|---|---|---|---|
| 2,401,689 | 6/1946 | Luboshez | 356—17 |
| 2,401,690 | 6/1946 | Luboshez | 356—14 |
| 2,401,692 | 6/1946 | Luboshez | 356—14 |

FOREIGN PATENTS

| | | | |
|---|---|---|---|
| 544,217 | 4/1942 | Great Britain | 350—301 |

DAVID SCHONBERG, Primary Examiner

M. J. TOKAR, Assistant Examiner

U.S. Cl. X.R.

350—288, 301